United States Patent [19]
Kammler et al.

[11] Patent Number: 5,791,126
[45] Date of Patent: Aug. 11, 1998

[54] TUBULAR BAGGING MACHINE

[75] Inventors: Roman Kammler, Worms; Walter Baur, Gruendau, both of Germany

[73] Assignee: Rovema Varpackungmaschinen GmbH, Fernwald, Germany

[21] Appl. No.: 890,916

[22] Filed: Jul. 10, 1997

[30] Foreign Application Priority Data

Jul. 11, 1996 [DE] Germany .......... 196 27 892.9

[51] Int. Cl.⁶ .......... B65B 51/30; B65B 9/20
[52] U.S. Cl. .......... 53/546; 53/552; 53/375.6
[58] Field of Search .......... 53/450, 451, 550, 53/551, 552, 553, 554, 546, 373.7, 375.6, 202

[56] References Cited

U.S. PATENT DOCUMENTS

| | | | |
|---|---|---|---|
| 2,237,119 | 4/1941 | Smith | 53/546 X |
| 4,729,210 | 3/1988 | Galliano | 53/551 X |
| 4,768,327 | 9/1988 | Mosher | 53/551 X |
| 5,170,609 | 12/1992 | Bullock et al. | 53/551 X |
| 5,203,145 | 4/1993 | Kammler et al. | 53/552 |
| 5,271,210 | 12/1993 | Tolson | 53/550 |
| 5,369,941 | 12/1994 | Rapparini | 53/546 |
| 5,533,322 | 7/1996 | Bacon et al. | 53/551 X |
| 5,540,035 | 7/1996 | Plahm et al. | 53/551 X |

Primary Examiner—Horace M. Culver
Attorney, Agent, or Firm—Flynn, Thiel, Boutell & Tanis, P.C.

[57] ABSTRACT

The welding jaws 7, 8 in a tubular bagging machine 1 for the creation of cross seams are driven by a drive 3 acting perpendicularly with respect to the foil-transporting direction 4 through a movable element 11. The jaw force (sealing force) is clearly increased through a lever 15 rotatable about a pivot point 17, and is precisely adapted to the requirements of a particle bagging operation. A drive with a small force, for example a linear motor 9, can be utilized in an economical manner in the tubular bagging machine of the invention. By providing a second drive, and connecting this drive to the lever (15), any desired motion path curves of the cross jaws and a continuous run sequence of the machine can be achieved. If the second drive stopped, then one has an intermittent tubular bagging machine.

15 Claims, 4 Drawing Sheets

TUBULAR BAGGING MACHINE

FIELD OF THE INVENTION

The invention relates to a tubular bagging machine with a foil-transporting device, a foil-shaping device, a fill pipe, a longitudinal sealing device, a device for welding the cross seams of bags, and a separating device for separating the foil tube into individual bags.

BACKGROUND OF THE INVENTION

Such tubular bagging machines are known. A foil strip unwound from a storage roller is shaped, for example, on a shaping shoulder representing the foil-shaping device into a foil tube. The longitudinal sealing device welds the longitudinal edges of the foil tube. The welded foil tube is filled with the product through the fill pipe and sealing cross jaws weld the foil tube laterally to create individual bags along the foil tube. The separating device, for example a stamping knife, cuts the individual bags from the foil tube.

An electric motor acts through a cam plate for movement of the cross jaws, which cross jaw movement is directed against one another.

The known high-performance packaging machine technology requires drives with high power. However, these high power drives are relatively expensive. Furthermore, the conventional machines have short sealing times and constant, long jaw opening travel paths.

The purpose of the invention is to provide a relatively low powered drive for the movement of the cross jaws of a tubular bagging machine, and at the same time realize a high power operation of the cross jaws. Furthermore, the drive is supposed to act equally onto both cross jaws and have adjustable sealing forces. Furthermore, the drive must operate along any desired paths for the cross jaws because it is desirable to have a tubular bagging machine which achieves various sealing paths. Thus, the cross jaws may operate through optimum cross jaw opening paths improving efficiency of the tubular bagging machine.

SUMMARY OF THE INVENTION

The purpose is attained in a tubular bagging machine having a foil transporting device moving foil through the machine, a foil-shaping device shaping foil into a desired shape, for example a foil tube, a longitudinal sealing device attaching the longitudinal edges of the shaped foil together, a fill pipe dispensing product into the shaped foil, a cross seam welding device creating individual bags in the shaped foil, and a separating device separating the individual bags from the foil tube. A drive acting perpendicularly with respect to the foil-transporting direction is provided with a movable element. A lever is rotatably connected to the movable element, the lever being rotatable about a pivot point. A swivel joint connects each jaw of the welding device to the lever creating an increased lever force created by the drive acting on the jaw.

The invention has the advantage that even by using an inexpensive, lower power drive a high force for the movement of the cross jaws of a tubular bagging machine can be realized since a lever mechanism results in a force increase. The drive acts equally onto both cross jaws (pincer movement) since both cross jaws are hingedly connected to the same lever. Each cross jaw experiences during a deflection of the lever caused by the drive a similar or equal movement, for example a jaw closing or a jaw opening movement. The movable element is moved relatively far by the drive along a reciprocating path. Thus, the drive can create a sufficiently large force for the jaw movement. The jaw closing and opening movement path is, adjusted to the relatively thin bag thicknesses, minimized.

Furthermore, the drive can already accelerate in a time-saving manner for the purpose of achieving a minimum speed in order to move through the relatively slow starting phase of a jaw opening or closing operation without a corresponding jaw function being carried out. The same is true for the deceleration of the drive.

When a drive adjusting rail extending parallel with respect to the foil-transporting direction is connected to the movable element and a carriage including a pivoting joint is movably arranged on the drive adjusting rail, then the lever can be pivoted by moving the movable element. The lever connected to the joint in the carriage is thereby urged perpendicularly with respect to the foil-transporting direction by the drive. The rail guides the carriage parallel with respect to the foil-transporting direction and the lever still correspondingly pivots about the pivot point when the carriage is moved in the direction parallel to the foil-transporting direction.

An equal pressure application and a deflection of the welding jaws, which deflection is the same with respect to the amount, however, it is oppositely directed, is achieved when the pivot point is arranged centrally between swivel joints connecting rods to the lever. The relationship of the distance between the pivot point and the joint, on the one hand, and the pivot point and a swivel joint, on the other hand, determines the factor of the power increase by the lever.

A positioning drive acting parallel with respect to the foil-transporting direction is connected to a movable component on which rests the pivot point. Thus in addition, the cross jaws can experience a positioning deflection parallel with respect to the foil-transporting direction. Therefore the cross jaws have a free path selection in one plane along the movable range of the movable component. The paths can consider different functions, for example, stripping the foil tube, shorter or longer welding times, a quick swinging back of the jaws into an initial position for a welding operation, etc.

When the positioning drive can be turned off and is stationary in the turned-off state, then the deflection of the welding jaws parallel with respect to the foil-transporting direction is prevented, and the tubular bagging machine operates in a cyclical mode and no longer in a continuously moving mode. The drives are in the continuous mode when adjusted with respect to one another by a computer control so that in each case a curved path specified by the computer control for operation of the welding jaw occurs.

When a stop is provided on the rail for the carriage, then boundaries for the movement of the welding jaws are fixed.

Extremely quick movements of the welding jaws are achieved when a linear motor is provided as the drive. Straight linear motors are clearly less expensive when they output a relatively low force, for example 1,000 Newton. Linear motors outputting a higher force, for example 5,000 Newton, are not only clearly more expensive but also increase stress on the tubular bagging machine due to their large mass. In spite of an additional lever mechanism, an obvious mass and expense advantage through the use of a linear motor with a low power is achieved. A speed reduction for the jaw movement does not exist since a linear motor accelerates extremely quickly up to twenty times the acceleration due to gravity.

The mass driven in a direction of the force of gravity by a drive is again retarded and the movement back, i.e. in a direction opposite the force of gravity, is supported and thus occurs quicker when a movable element of a drive acting in the direction of the force of gravity is connected to a spring having an upwardly acting spring force. The spring stores kinetic energy from the element during a downward movement and converts it into spring energy. It returns the stored spring energy to the element during an upward movement.

When the welding jaws are a part of the foil-transporting device, whereby the drive acts perpendicularly with respect to the foil-transporting direction and is provided for the closing and the opening of the welding jaws and for the further transport of the foil tube and the flat foil strip, then a so-called pincer removal is achieved. An advantage hereby is that a separate foil-transporting device, for example a belt transporter, is not needed, and the welding jaws are used for transporting the foil.

When several fill pipes are provided each with a foil-shaping device, the two welding jaws extend transversely with respect to the foil tubes, a foil cutter is provided between two foil-shaping devices in the foil-transporting direction in front of the foil-shaping devices, and a single storage roller with one wound-up foil strip is provided, then several advantages are achieved. On the one hand, the technical input for a so-called multi-purpose machine with several fill pipes is obviously reduced compared with several individual machines. On the other hand, only one storage roller is needed, and when the storage roller is empty all fill pipes are again supplied with foil from the storage roller by means of a single changing operation. Finally, only two welding jaws are needed in the multi-purpose machine replacing the welding-jaw pair otherwise associated with each fill pipe.

When the tubular bagging machine is a vertical tubular bagging machine, then described advantages are especially achieved since in such a machine a freely selectable welding-jaw movement for the jaw rotation, a stripping of the foil tube or other jaw functions can be realized.

Other objects and purposes of this invention will be apparent to persons familiar with machines of this general type upon reading the following specification and inspecting the accompanying drawings.

BRIEF DESCRIPTION OF THE DRAWINGS

The invention will be described in greater detail in connection with figures illustrating exemplary embodiments, in which.

DETAILED DESCRIPTION

Figure 1:
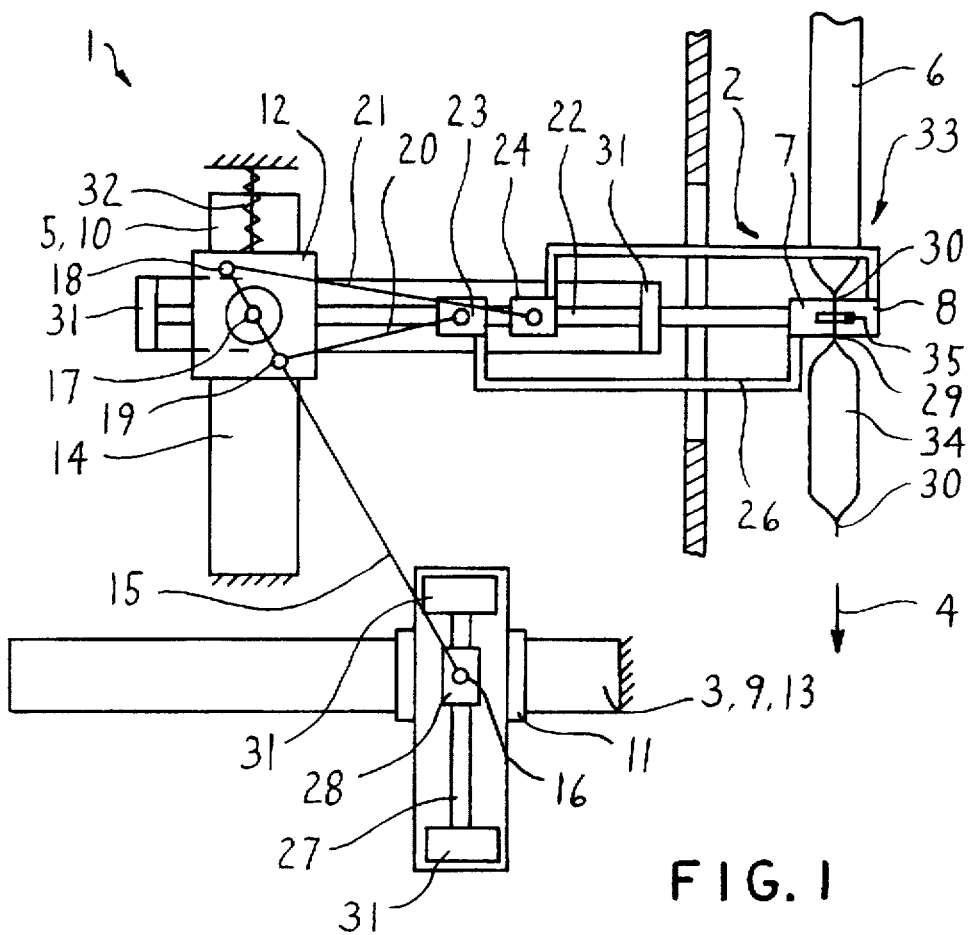
FIG. 1 is a schematic side view of a vertical tubular bagging machine including a device for welding together the bag cross seams with two cross-seam jaws, a linear motor acting perpendicular to the foil-transporting direction and a linear positioning motor acting parallel to the foil-transporting direction, and a lever system for producing a higher, adjustable sealing force for the operation of the cross-sealing jaws, the welding jaws being shown closed.

The device 2 for welding the cross seams of a bag in a vertical tubular bagging machine 1 is movable both by means of a cutting-operation drive 3 perpendicular with respect to the foil-transporting direction 4, and also by means of a positioning drive 5 parallel with respect to the direction of movement of the foil tube 6 (FIG. 1). The drives 3, 5 are each controlled separately through a computer control.

The device 2 has two welding jaws 7, 8. Both drives 3, 5 are linear motors 9, 10 consisting of a movable element 11, 12 and one power element 13, 14 driving the movable elements 11, 12.

A lever 15 is rotatably connected through a pivoting joint 16 to the movable element 11 of the drive 3. The lever 15 is furthermore rotatably fastened to a pivot point 17 in the movable element 12. Rods 20, 21 are pivotally connected with the lever 15 and with carriages 23, 24 movable on a rail 22 through a respective swivel joint 18, 19. The pivot point 17 is arranged centrally between the swivel joints 18, 19. Each carriage 23, 24 is in turn rigidly connected to a welding jaw 7, 8 by means of a connection piece 25, 26. The lever 15 is used to create an increased force for operating of the welding jaws 7, 8.

A rail 27 extending parallel with respect to the foil-transporting direction 4 is connected to the movable element 11 of the drive 3. A carriage 28 is movably fastened to the rail 27. The positioning drive 5 acting parallel with respect to the foil-transporting direction 4 is connected to the pivot point 17 on the movable element 12. The positioning drive 5 can be turned off and is stationary in the turned-off state. When drive 5 is turned off, the welding jaws 7, 8 remain at all times at the same height, for example for a cyclical welding of the cross seams 29, 30 of the bag. When drive 5 is turned on, it enables a change in the height of the welding jaws 7, 8, and when acting together with the horizontally acting drive 3 closed path curves for the welding-jaw movement are created.

The rail 22 is connected to the movable element 12 connected to the drive 5. The rail 22 carries the carriages 23, 24 thereon. Both rails 22, 27 each have two stops 31 at the ends thereof.

The element 12, which is movable parallel with respect to the direction of the force of gravity, is suspended on a spring 32.

The welding jaws 7, 8 may be part of the foil-transporting device 33, when no separate foil-transporting mechanism is provided. The drive 3, which acts perpendicular with respect to the foil-transporting direction 4, is provided for closing and opening of the welding jaws 7, 8, and for creating an adjustable sealing pressure. The vertically acting drive 5 is also utilized for transporting the foil tube 6.

The foil tube 6 is pulled downwardly by the compressed welding jaws 7, 8 during the welding operation. The pulling down of the foil tube 6 is caused by a downward movement of the movable element 12, the closing of the jaws by a deflection of the movable element 11 to the right (FIG. 1).

A tubular bag 34 transversely welded by the welding jaws 7, 8 and previously filled is separated from the foil tube 6 by means of a separating device 35, for example a knife or suitable cutter.

Figure 2:
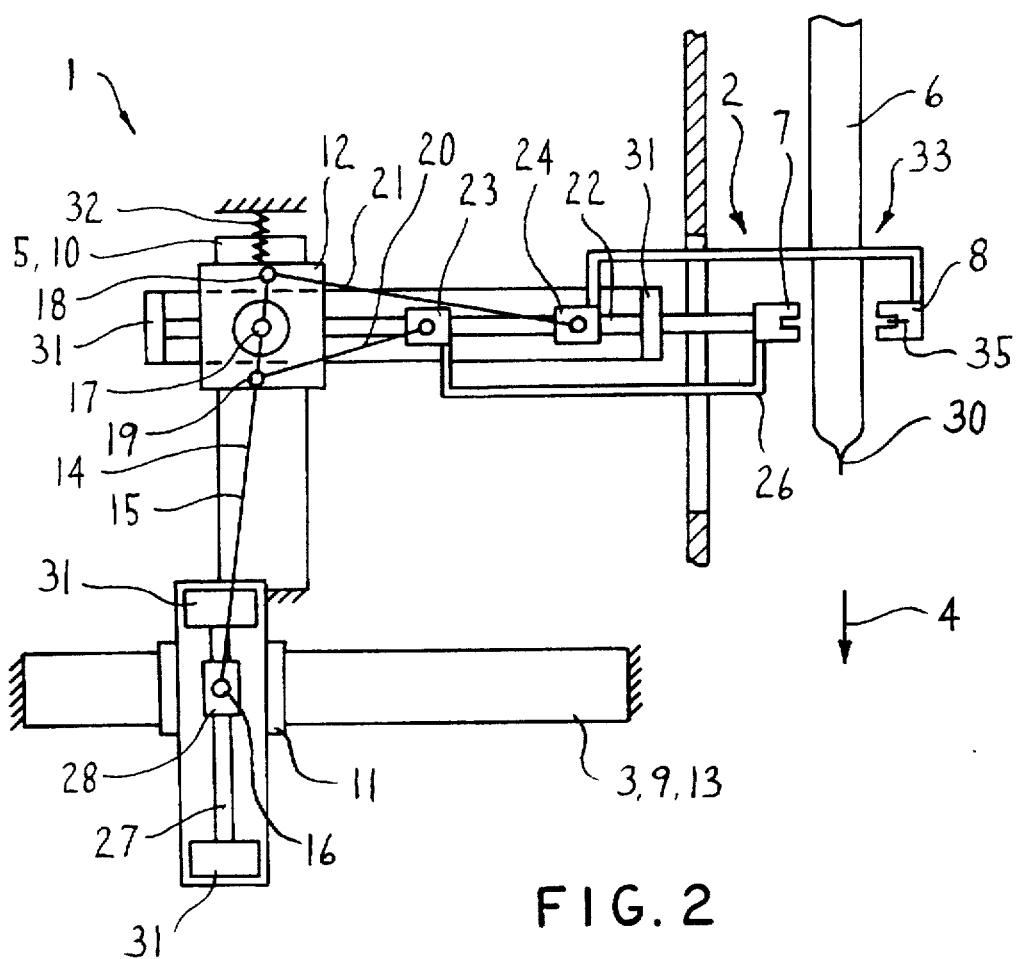
FIG. 2 is a side view of the subject matter of FIG. 1, however, in a state where the welding jaws are open.

After the tubular bag has been separated, the welding jaws 7, 8 are moved upwardly by an upward movement of the movable element 12 and the foil tube 6 is filled (FIG. 2). The upward movement is assisted by the restoring force of the spring 32. Prior to the upward movement, the welding jaws 7, 8 were opened by a deflection of the movable element 11 to the left (FIG. 2). On top of the product in the filled tube 6, the welding jaws 7, 8 are closed again (FIG. 1) and then weld the foil tube 6 during their path downward, and thereby pull the foil tube 6 downwardly (in the bagging machine without a foil-removing mechanism).

Figure 4:
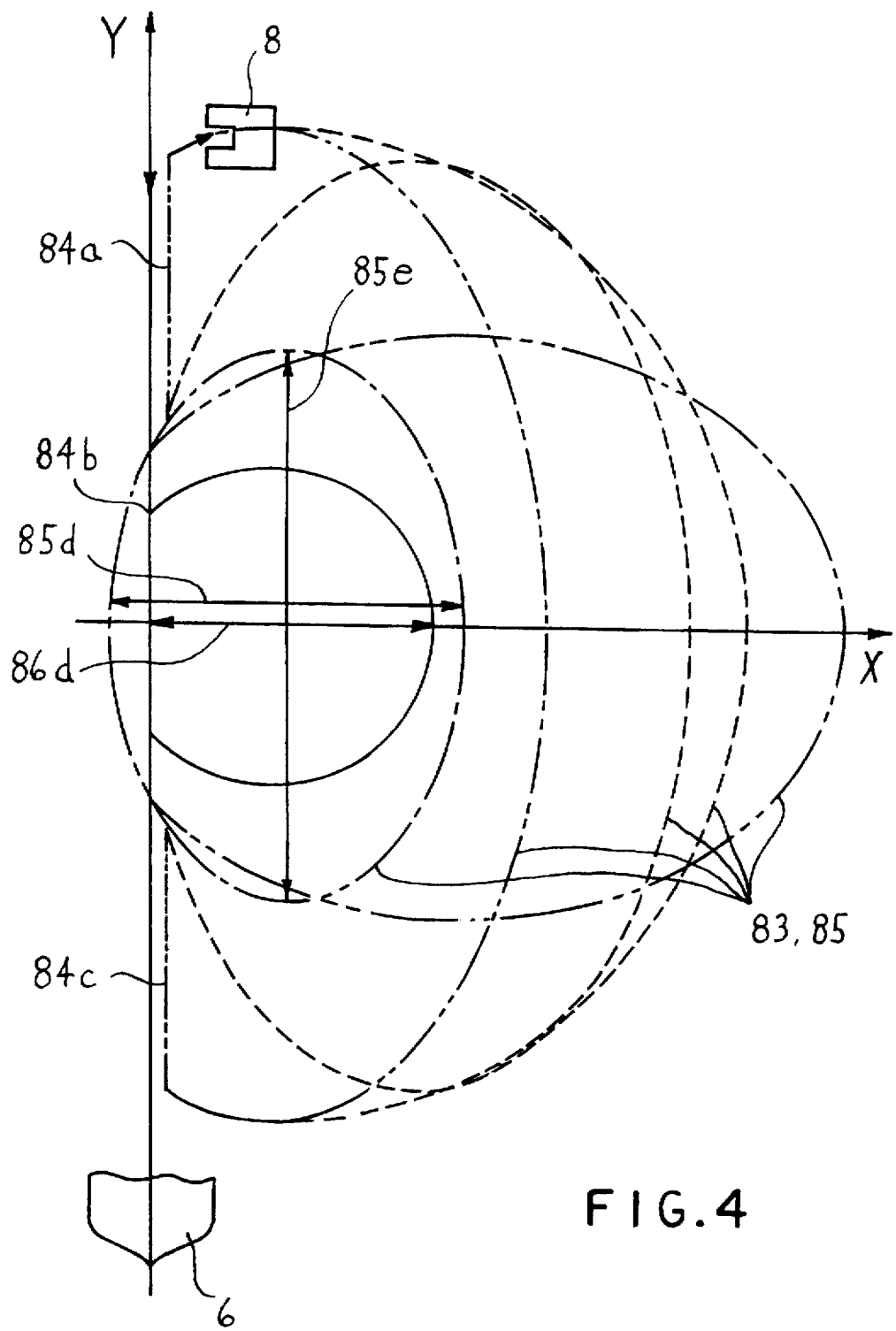
FIG. 4 shows some of the possible paths of the welding jaws in a coordinate system, whereby the paths of the welding jaws are shown parallel with resect to the foil tube during at least one straight portion of a path and otherwise have an elliptical path.

The device 2 for welding the cross seams 29, 30 of the bag may be moved for a continuous operation, for example on paths 83 (FIG. 4). The straight line segments 84a, 84b, 84c, which are parallel to one another illustrate movement of the tube 6 in the foil moving direction as a result of the jaws 7, 8 gripping the tube 6 and movement provided by vertically acting drive 5. An elliptical path 85 completes the continuous operation of the jaws 7, 8 (FIG. 4). The ellipse diameter 85d is in the direction perpendicular with respect to the foil-transporting direction 4 smaller than the ellipse diameter 85e in direction parallel to foil-transporting direction. The path distance 86d in a direction perpendicular with respect to the tube 6 of the devices for welding the cross seams 2 of the bag is specified dependent on the thickness of the created bags.

Just prior to a cross-welding operation in a vertical tubular bagging machine, the devices 2 for welding the cross seams 29, 30 of the bag are moved parallel with respect to the foil tube 6 and without contacting the foil 6 downwardly along the path 84a. They thereby have a greater relative speed than the tube 6. A product remover (not illustrated) connected to the device 1 or the welding jaw itself sweeps over the tube 6 and loose material in the tube 6 is additionally moved downwardly.

The device 2 can also cool the seam. The devices 2 for welding the cross seams 29, 30 of the bag are for this purpose after a cross-welding operation positioned along the path 84c parallel with respect to the tube 6 without contacting the tube 6, whereby they have the same relative speed as the tube 6. A cross seam 29, 30 of a bag is cooled in this position by means of a cool-air outlet (not illustrated) connected to the device 2.

Figure 3:
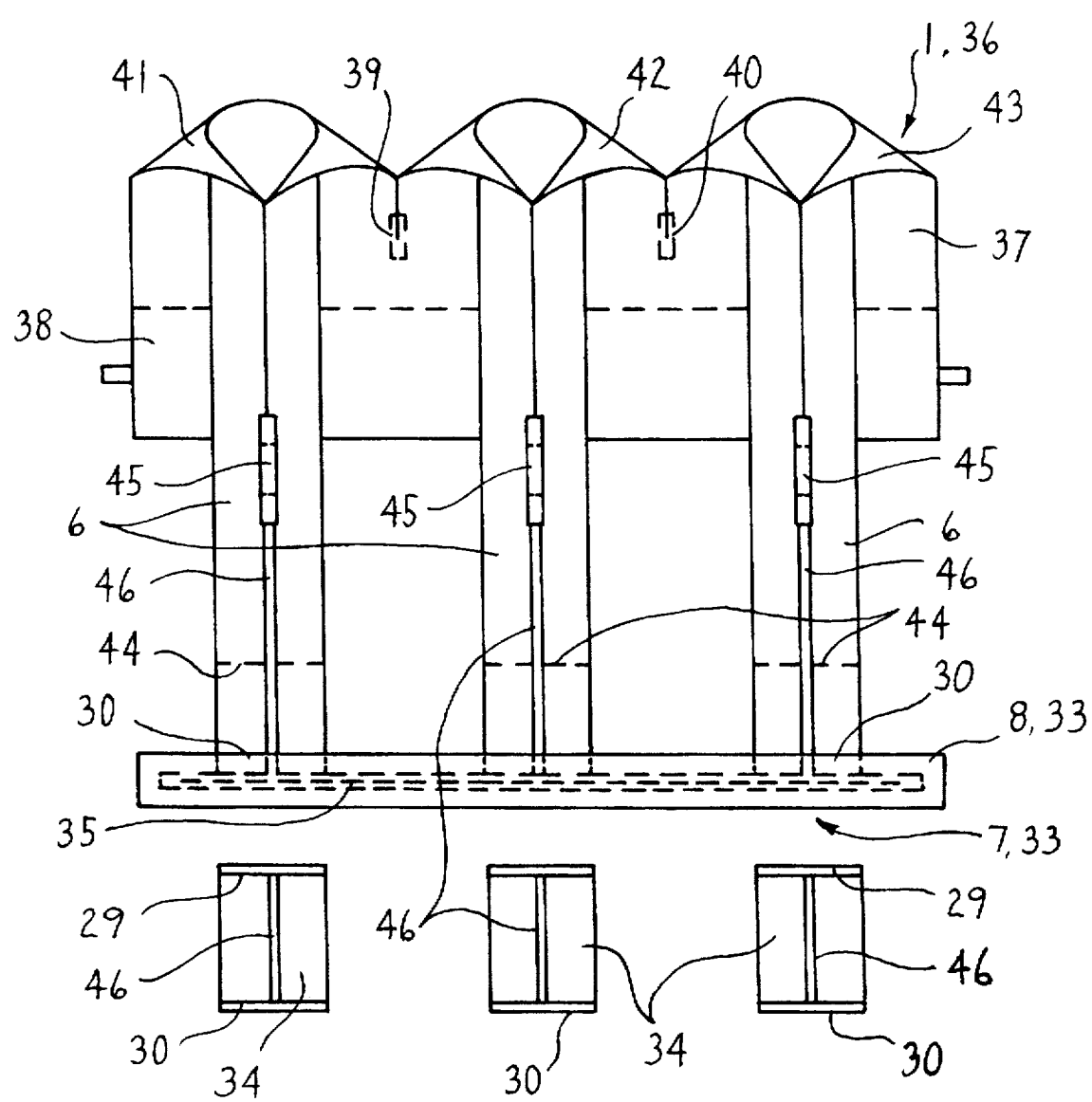
FIG. 3 is a side view of a vertical tubular bagging machine having three fill pipes, a foil-shaping device being provided with each fill pipe, two welding jaws extending transversely with respect to the three foil tubes, and one single foil strip being supplied from the storage roller and thereafter longitudinally separated by two foil cutters.

The vertical tubular bagging machine 1 is provided as a multi-purpose machine 36 in a further exemplary embodiment (FIG. 3). A flat foil strip 37 is unwound from a storage roller 38 by means of the welding jaws 7, 8 serving as the foil-transporting device 33 and are lengthwise separated by passing at least two foil cutters 39, 40. The three created foil strips are shaped each into a foil tube 6 on three foil-shaping devices 41, 42, 43. The foil tubes 6 are welded lengthwise by means of a longitudinal sealing device 45 acting against a fill pipe 44 and the foil tube 6 forming a longitudinal seam 46.

The two welding jaws 7, 8 extend transversely to the three foil tubes 6 and create during a welding operation at the same time the top-side cross seams 29 of the already filled three tubular bags 34 and the bottom-side cross seams 30 of the following three tubular bags. A separating device 35 in a welding jaw 8 separates all three foil tubes 6.

The two welding jaws 7, 8 are driven analogous to the exemplary embodiment described above and shown in FIGS. 1 and 2.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A tubular bagging machine comprising a foil-transporting device transporting foil in a foil transporting direction, a foil-shaping device, a fill pipe, a longitudinal sealing device, a device for welding the cross seams of a bag and a separating device, wherein the improvement comprises a drive acting perpendicularly with respect to the foil-transporting direction being provided with a movable element, a lever being rotatably connected to the element, the lever being rotatably fastened in a pivot point on the element, and wherein the welding device includes plural welding jaws, each welding jaw of the device for welding being connected through swivel joints to the lever, whereby an increased lever force results in an increased force of the welding jaws on the shaped foil.

2. The tubular bagging machine according to claim 1, wherein a rail extending parallel with respect to the foil-transporting direction is connected to the movable element, and wherein a carriage including a pivoting joint is movably arranged on the rail, said lever being connected to the pivoting joint.

3. The tubular bagging machine according to claim 2, wherein the pivot point is arranged between the swivel joints.

4. The tubular bagging machine according to claim 1, wherein the pivot point is arranged centrally between the swivel joints.

5. The tubular bagging machine according to claim 1, wherein a second drive acting parallel with respect to the foil-transporting direction is provided, a second movable element including a pivot point is connected to the drive.

6. The tubular bagging machine according to claim 5, wherein the second drive is selectively operable between turned-on and turned-off states and is stationary in the turned-off state.

7. The tubular bagging machine according to claim 1, wherein a computer control is connected to the drive.

8. The tubular bagging machine according to claim 1, wherein an adjustable sealing force is produced by regulating one of a thrusting force of the drive and a thrusting force of a suitable linear linkage system, the welding jaws act against one another during both thrusting of the drive and thrusting of the linear linkage system.

9. The tubular bagging machine according to claim 2, wherein a stop defining each end of the rail is provided on the rail as an abutment for stopping the carriage.

10. The tubular bagging machine according to claim 1, wherein said drive is one of a linear motor and a linear drive system.

11. The tubular bagging machine according to claim 5, wherein at least one spring supports the second movable element connected to the second drive acting parallel with respect to the direction of the force of gravity, the spring having an upwardly-acting spring force.

12. The tubular bagging machine according to claim 5, wherein the welding jaws are part of the foil-transporting device, wherein the first-mentioned drive acts perpendicularly with respect to the foil-transporting direction and closes and opens the welding jaws, and wherein the second drive provides a motive force for transporting a flat foil strip and the foil tube in the foil-transporting direction.

13. The tubular bagging machine according to claim 1, wherein a plurality of fill pipes are provided, and one foil-shaping device is associated with each fill pipe, wherein the two welding jaws extend transversely with respect to the foil tubes, wherein a foil cutter is positioned between two adjacent foil-shaping devices, and wherein a single storage roller holding one wound-up foil strip is provided for supplying foil to the foil-shaping devices.

14. The tubular bagging machine according to claim 1, the tubular bagging machine is a vertical tubular bagging machine.

15. The tubular bagging machine according to claim 5, wherein the first-mentioned and second drives produce desired cross jaw paths.

* * * * *

UNITED STATES PATENT AND TRADEMARK OFFICE
CERTIFICATE OF CORRECTION

PATENT NO. : 5,791,126
DATED : August 11, 1998
INVENTOR(S) : Roman KAMMLER et al It is certified that error appears in the above-indentified patent and that said Letters Patent is hereby corrected as shown below:

On the title page, item [73]; change

"Varpackungmaschinen" to

---Verpackungsmaschinen---.

Column 6, line 28; change "claim 1" to ---claim 2---.

Signed and Sealed this

Twenty-fourth Day of November,1998

Attest:

BRUCE LEHMAN

*Attesting Officer*  *Commissioner of Patents and Trademarks*